No. 636,811. Patented Nov. 14, 1899.
H. E. KIRSTEIN.
CASE FOR EYEGLASSES OR SPECTACLES.
(Application filed July 14, 1899.)
(No Model.)

Witnesses:
Walter B. Payne
F. Willard Rich.

Inventor:
Henry E. Kirstein
by Church & Church
his Attorneys.

THE NORRIS PETERS CO., PHOTO-LITHO., WASHINGTON, D. C.

UNITED STATES PATENT OFFICE.

HENRY E. KIRSTEIN, OF ROCHESTER, NEW YORK.

CASE FOR EYEGLASSES OR SPECTACLES.

SPECIFICATION forming part of Letters Patent No. 636,811, dated November 14, 1899.

Application filed July 14, 1899. Serial No. 723,844. (No model.)

*To all whom it may concern:*

Be it known that I, HENRY E. KIRSTEIN, of Rochester, in the county of Monroe and State of New York, have invented certain new and useful Improvements in Cases for Eyeglasses or Spectacles; and I do hereby declare the following to be a full, clear, and exact description of the same, reference being had to the accompanying drawings, forming a part of this specification, and to the reference-numerals marked thereon.

My present invention has for its object to provide a case or receptacle adapted particularly for holding eyeglasses or spectacles and provided with offset nose-pieces or bridges, one in which the sides are capable of being separated sufficiently to permit the insertion and withdrawal of the glasses, and which will normally close over the latter, assuming a comparatively flat form without bearing against the glasses themselves.

To these and other ends my invention consists in certain improvements in construction, all as will be hereinafter described and the novel features pointed out in the claims at the end of this specification.

Figure 1:
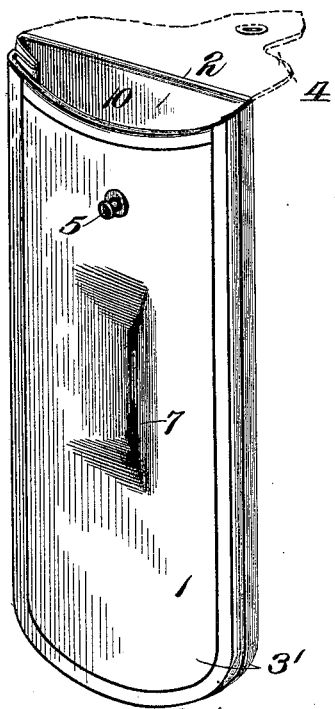
Figure 3:
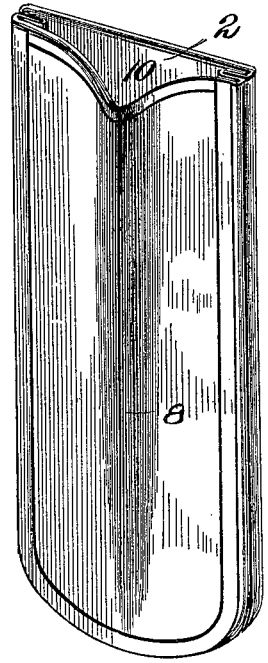
Figure 2:
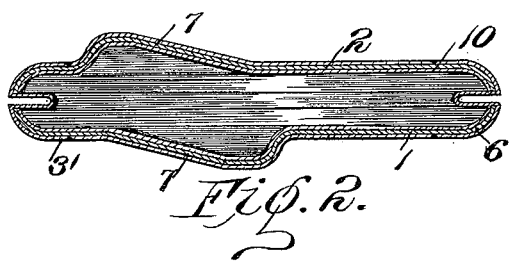
Figure 4:
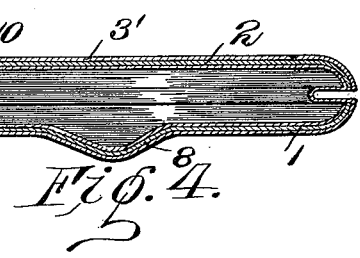

In the drawings, Figure 1 is a perspective view of a case constructed in accordance with my invention; Fig. 2, a cross-sectional view thereof; Fig. 3, a perspective view of a modification; Fig. 4, a cross-sectional view of the latter.

Similar reference-numerals in the several figures indicate similar parts.

It is essential in constructing a case adapted for this purpose that it be composed of stiff material, such as cardboard or thin sheet metal, and that its sides be separated a distance sufficient to prevent their contact with the lenses and nose-pieces or bridges, whereby the latter may be injured. In the present embodiment of my invention I provide a case consisting of the front and rear panels 1 and 2, having a flexible connection arranged between their sides or edges and the lower end, the upper end being preferably open to permit the insertion of the glasses, although a suitable flap 4 (shown in dotted lines in Fig. 1) might be applied to the rear panel, if desired, and secured by any suitable means 5, such as a ball-and-socket fastening, one member of which is located upon the front panel 1. The lower end of the casing is preferably curved slightly, as shown, and the sides and bottom edges of each of the panels are provided with the inwardly-extending flanges 6, adapted to engage with each other to hold the panels separated and to prevent their contact with the glasses or parts of the frame. The flanges extending around the three sides of the panels also serve to strengthen the latter, forming a very stiff and serviceable case.

In order to provide the case for suitably holding glasses or spectacles in which the bridges or nose-pieces are offset and arranged at an angle to and project beyond the plane of the lenses, I provide suitably-arranged indentations or recessed portions 7, arranged centrally of the length of the casing and extending outward from the interior of the casing, as shown particularly in Fig. 2; but as in some forms of eyeglasses the nose-pieces or bridges extend entirely upon one side of the lenses to accommodate such forms of glasses I have shown a modified construction of my case, (illustrated in Figs. 3 and 4,) in which the raised or embossed portion 8 is formed only in the outer panel 1, which may, if desired, extend through to the upper edge of the panel, as shown.

The case is suitably finished to present a neat appearance by a covering 3', of leather or other suitable material, secured upon the exterior of the panels, a small portion of which or of a separate piece of flexible material, as leather, is turned inward over the edges of the flanges 6, projecting into the casing and forming the flexible bellows connection 3 between the sides of the case.

10 indicates a lining of soft material, such as felt, provided upon the interior of the casing, affording a further protection to the glasses.

Cases constructed in accordance with my invention are very serviceable, protecting the glasses and parts from breakage, and by reason of the flexible connection at the edges of the sides may be distended to permit their ready insertion and removal.

I claim as my invention—

1. A collapsible case for eyeglasses and spectacles open at one edge consisting of the two stiff side pieces, one of them having the inwardly-turned flange at the edge, and flexible connections between three of the edges of the side pieces.

2. A case for eyeglasses or spectacles consisting of the two stiff side pieces having the inwardly-turned flanges at the edges, and the flexible connections between said flanges.

3. A case for eyeglasses or spectacles, consisting of the two stiff side pieces having the inwardly-turned flanges at the edges, and the flexible and extensible connecting-pieces extending inwardly between the flanges.

4. A case for eyeglasses or spectacles consisting of the two stiff side pieces having the inwardly-turned flanges at the edges, one of said side pieces being recessed for the accommodation of a bridge or nose-piece of the contained eyeglasses or spectacles, and flexible connections extending inwardly between three of the edges of the side pieces.

HENRY E. KIRSTEIN.

Witnesses:
F. F. CHURCH,
G. WILLARD RICH.